United States Patent [19]

Jones

[11] Patent Number: 4,664,342

[45] Date of Patent: May 12, 1987

[54] METHODS OF DEPLOYING PARACHUTES

[75] Inventor: David J. Jones, Amesbury, England

[73] Assignee: The Secretary of State for Defence in Her Britannic Majesty's Government of the United Kingdom of Great Britain and Northern Ireland, London, England

[21] Appl. No.: 799,450

[22] Filed: Nov. 19, 1985

[30] Foreign Application Priority Data

Nov. 19, 1984 [GB] United Kingdom ............... 8429202

[51] Int. Cl.⁴ ..................... B64D 17/52; B64D 17/62
[52] U.S. Cl. ................................. 244/147; 244/149
[58] Field of Search ............... 244/142, 147, 148, 149, 244/150, 152

[56] References Cited

U.S. PATENT DOCUMENTS 2,583,905  1/1952  Thompson ..................... 244/148
2,784,927  3/1957  Turolla ......................... 244/152
4,399,969  8/1983  Gargano ....................... 244/149

FOREIGN PATENT DOCUMENTS 1193218   4/1959  France ......................... 244/149
2163321   7/1973  France .
2514724   4/1983  France ......................... 244/152
2118113A 10/1983  United Kingdom .

Primary Examiner—Galen Barefoot
Attorney, Agent, or Firm—Stevens, Davis, Miller & Mosher

[57] ABSTRACT

A ram air parachute assembly adapted for deployment by use of static line suitable for use at high altitudes and high drop speeds, the parachute assembly comprising a ram air parachute 21, a pilot parachute 23, attached by a bridle line 22, and slideable square 25 to the ram air parachute, and being packed in a parachute bag 10 attachable to an aircraft by way of a static line 11.

2 Claims, 5 Drawing Figures

Fig. 3.
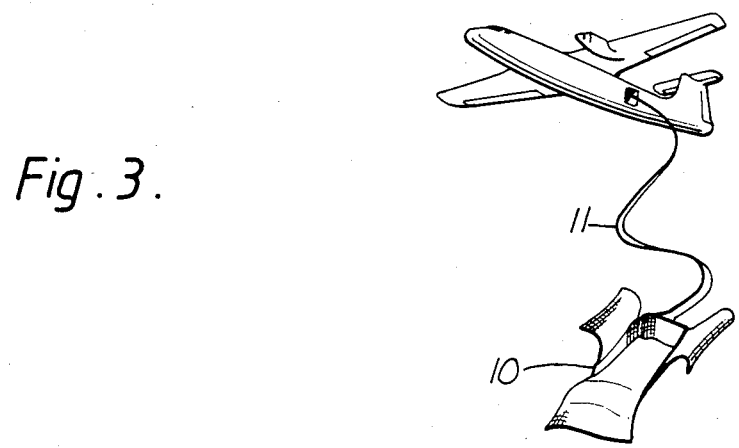
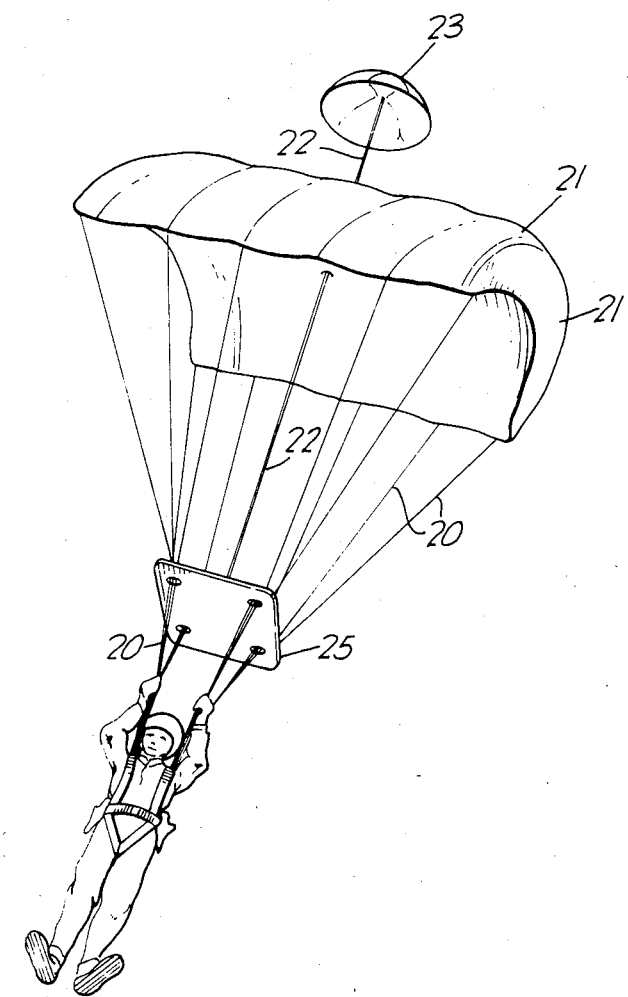

METHODS OF DEPLOYING PARACHUTES

This invention relates to an improved method of deploying parachutes, particularly to deploying ram air parachutes by use of a static line at relatively high speed and with a relatively heavy load.

In many applications the use of a ram-air parachute is preferred because it is more controllable than other types of parachute and can achieve a higher forward drive speed than other known parachutes.

Ram air parachutes are normally deployed in the free fall mode in which the parachutists determine the moment of deployment of the parachute. In some conditions this system has the disadvantage that the shock loadings on the parachutist at the time of opening of the parachute are very high with the consequently very real risk of causing injury. It is further disadvantage that the free fall parachutist must undergo extensive and regular training in the art of free fall parachuting. It is thus desirable to have a method of deploying a ram air parachute by a static line; so obviating the need for much of the expensive and time consuming free fall training and providing an increased range of dropping conditions for parachutists without increasing the risks or shock loadings.

Under some of the more extreme conditions of dropping ram air parachutes in the free fall mode the shock loadings imposed upon the parachutist are extremely high and likely to cause severe injury. The shock loads can be as high as 12 'g'. This invention provides for a method of deployment such that these shock loadings are reduced to a lower and consistent level but at the same time the speed and altitude of the exit from the aircraft may be significantly increased.

In normal military applications a military parachutist will exit from an aircraft travelling up to 185 km/h, which is rather more than the normal 100-130 km/h used by recreational parachutists. It is desirable to be able to exit from an aircraft travelling at still higher speeds and this invention makes it possible to use a static line deployment from an aircraft travelling at approximately 225-240 km/h at altitudes of up to about 8,500 m whilst still maintaining relatively low shock loadings.

In a normal static line deployment one end of the line which is attached to the aircraft the other end is attached to the parachute packing bag. After exiting from the aircraft the slack in the static line is taken up as the parachutist falls away from the aircraft and the bag is pulled off the parachute which is then able to deploy.

The type of parachute normally deployed by use of a static line is the circular type canopy, however, the use of a ram air canopy offers several significant advantages for parachutists particularly in directional controllability. It is an object of the present inventon to provide an increased range of parachute dropping conditions whilst also providing an increased range of conditions for employing a static line deployment for a ram-air parachute.

According to the present invention there is provided a parachute assembly adapted for deployment by use of a static line having a main parachute canopy attachable by rigging lines to a harness, a square slideably mounted on the rigging lines, a bridle line, a first end of the bridle line attached to the square and a second end of the bridle line attachable to a pilot parachute the parachutes being packable into a parachute bag, a static line, a first end of the static line being attached to the parachute bag and a second end of the static line being attachable to an aircraft, the parachutes being arranged in the parachute bag such that on withdrawal from the bag the pilot parachute deploys and develops producing a tension on the bridle line, the tension being maintained on the bridle line such that the square is held towards the main parachute canopy so delaying the deployment of the main parachute canopy until the harness is generally below the main parachute, at which stage the pilot parachute is generally masked permitting development of the main parachute because of the reduced tension in the bridle line, and increasing drag on the main parachute canopy.

This method of deployment is also particularly suitable for use at high altitudes where because of the lower static atmospheric pressure the downward terminal velocities of the parachutists are much higher and so the shock loadings on opening of the parachute will be very high.

The effect of the pilot parachute being attached to a bridle line to a slideable square attached to rigging lines is to maintain the square near the canopy so preventing the rigging lines and canopy from spreading thus delaying deployment of the main parachute canopy. As the parachutist falls to a position generally below the main canopy and most of his forward velocity is lost, the pilot parachute is masked by the much larger main canopy with the effect that less drag is experienced by the pilot parachute and the increasing drag and billowing on the main parachute canopy will result in the square sliding down the rigging lines to a position close to the harness, so that the main canopy will open fully.

By using this combination of main parachute and pilot parachute the deceleration shock loads imposed upon a parachutist or load are reduced to a lower and more consistent level with the effect of enabling the range of speeds, altitudes and weights of parachute drops to be increased.

It should be noted that the square is a piece of flexible material which is not necessarily square in shape but may be rectangular for example and which is formed so that the rigging lines of the parachute may pass slideably through purpose made apertures, the effect of the sqare on the main canopy once deployed being to hold the rigging lines in a spaced apart relationship.

According to a second aspect of the invention there is provided a parachute assembly for deployment of a ram-air parachute by use of a static line and wherein the assembly comprises a main parachute canopy of the ram-air type attachable by rigging lines to a harness, a square slideably mounted on the rigging lines, a bridle line having a first end attachable to the square, a second end attachable to a pilot parachute, the parachutes being packable into a parachute bag, a static line, a first end of the static line being attached to the parachute bag, a second end attachable to an aircraft, the packing arrangement ensuring withdrawal of the rigging lines and main parachute canopy prior to the pilot parachute.

The presence of the square near the canopy tends to prevent the deployment of the ram air parachute but the loosely folded pilot parachute deploys immediately upon withdrawal from the bag.

According to a further aspect of the present invention the pilot parachute may be tied into the bag by an easily frangible tie thus ensuring the pilot parachute leaves the bag after the main parachute.

An additional advantage of the present invention is that it permits the dropping of parachutists and equipment at high speed and from low altitude because the loss of height after exiting from an aircraft and before deployment of the ram air parachute is minimised and has been found to be typically of the order of 100 ft, whereas in a free-fall drop the loss of height is typically 500 ft. The invention may be employed for a wide range of dropping conditions including high speed low altitude drops in which the weight of the parachutist may be up to approximately 350 lbs. This is particularly useful where it is desired to drop parachutists in otherwise inaccessible areas with quantities of equipment.

In order that the present invention may be more fully understood one embodiment will be described with reference to the accompanying drawings of which FIG. 1 illustrates a complete parachute assembly packed into a bag and mounted on a harness with the tie line shown extended.

FIG. 3 illustrates the individual components of the system withdrawn from the packing bag in the order of withdrawal from the bag.

FIG. 4 shows the bag closed and FIG. 5 in its open position.

Figure 1:
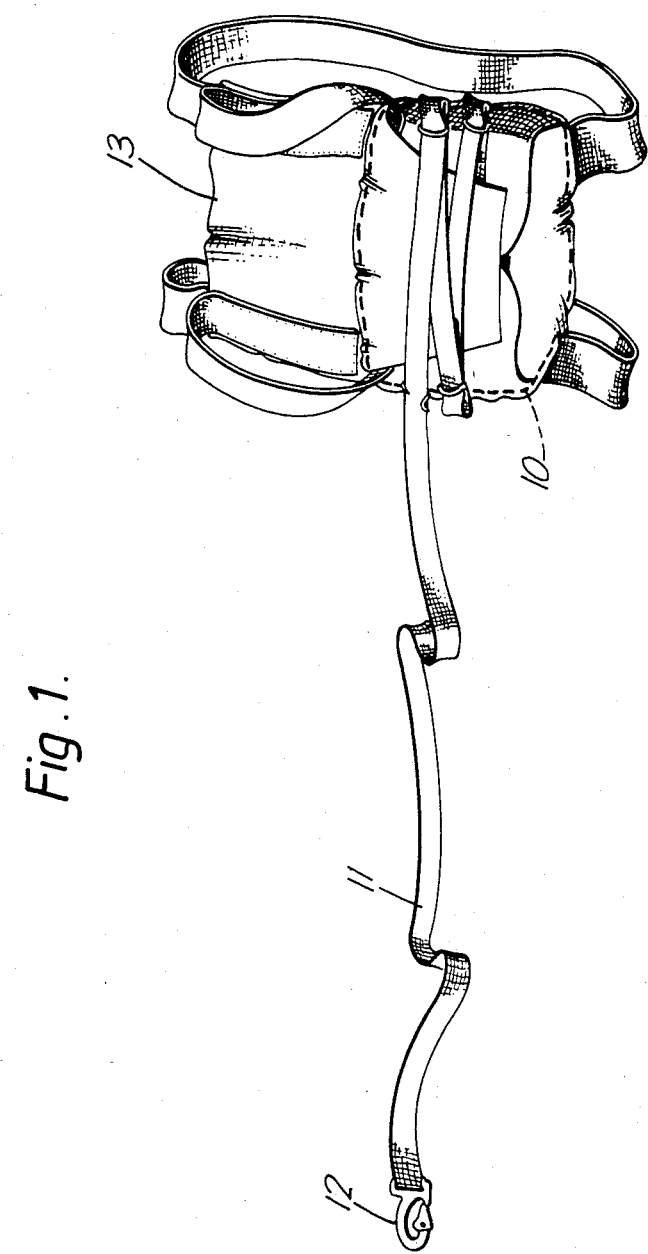

Referring now to the figures: FIG. 1 the complete assembly is shown with the parachute bag 10 packed with the parachutes and having attached to it a static line 11, attachable by way of clip 12 to the aircraft. The bag is mounted on a harness 13, adapted to be worn by a parachutist or to be attached to a piece of equipment.

Figure 2:
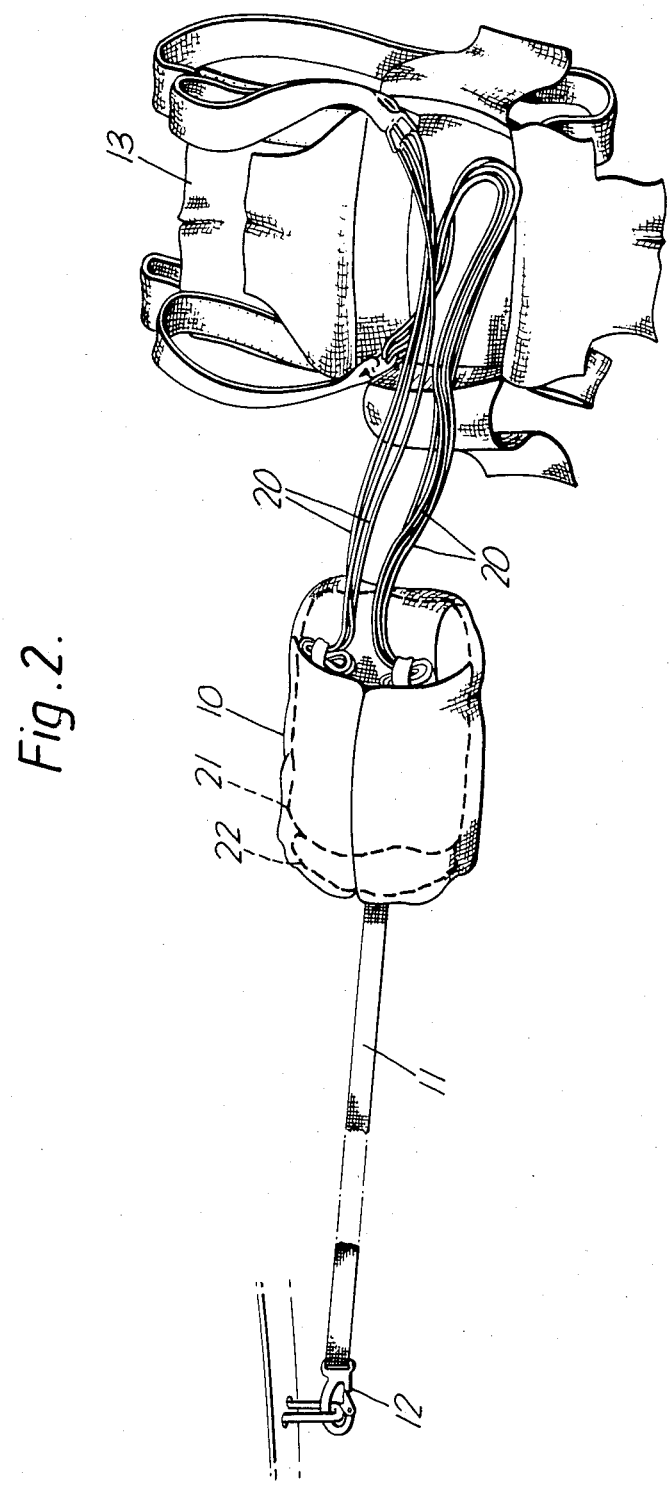
FIG. 2 illustrates the assembly without the harness attached and indicates the position of the parachutes in the packing bag.

FIG. 2 shows the arrangemnt of the parachutes inside the packing bag 10 as illustrated. The rigging lines 20, which are attached to the harness 13 (not shown), are shown withdrawn from the bag 10. The bag 10 contains mostly a folded ram air type parachute 21 and at one end a pilot parachute 22.

FIG. 3 illustrates the parachutes after withdrawal from the bag 10. The static line 11 one end of which is attached to the aircraft by means of clip 12 and the other end of which is attached to parachute bag 10. In operation the static line 11 will be tensioned when the parachutist or equipment exits the aircraft. As the parachutist falls from the aircraft the deployment sequence is initiated by removal of any locking or securing pins or the breaking of any frangible ties, followed by withdrawal of the rigging lines of the ram-air parachute 21. Once the rigging lines are fully extended the ram-air parachute is withdrawn from the bag. Attached to the ram air parachute 21 by a bridle line 22 is the pilot parachute 23. Withdrawal of the ram air parachute 21 permits withdrawal of the pilot parachute 23. In this application the pilot parachute 23, is preferably of the sport or throwaway type, that is soft and easily folded. It has been found to be unnecessary and inconvenient to use a spring loaded ejector type parachute, although such a parachute could be used if particularly desired. It has been found to be convenient to ensure that the pilot parachute leaves the packing bag after the ram air parachute and in addition to a carefully controlled packing sequence the pilot parachute is held in place by use of a frangible tie, with a breaking strain of approximately 12 kg.

In the deployment sequence the packing bag remains attached to the static line and consequently to the aircraft. As the ram air parachute is withdrawn from the bag it is maintained for a short time in a substantially folded arrangement by maintaining the square 25, in a position near the canopy so as to prevent the unfurling and development of the canopy and spreading of the rigging lines. This is achieved by maintaining a tension on the bridle line 22, one end of which is attached to the square 25, the other end of which is attached to the pilot parachute 23. In the meantime the parachutist will have started to fall vertically under the influence of gravity. At the time the parachutist has lost most of his forward velocity he will be falling downwards in a generally vertical direction and the ram air parachute will begin to deploy. At this stage the pilot parachute is partially shielded from the air flow with the result that the tension on the bridle line is lessened and the square is able to slide down the rigging lines toward the harness so permitting full deployment of the ram air parachute. In general the parachutist will not have reached terminal velocity when the ram-air parachute starts to develop and as a consequence the shock loadings have been found to be less than known systems and of the order of 3–6 g throughout the range of dropping conditions. After the ram-air parachute has successfully deployed the pilot parachute will tend to be masked by the ram air parachute and so fall limply onto the ram air parachute. Means could be provided for discarding it at this stage but it is normally retained and reused with the rest of the parachute.

Figure 4:
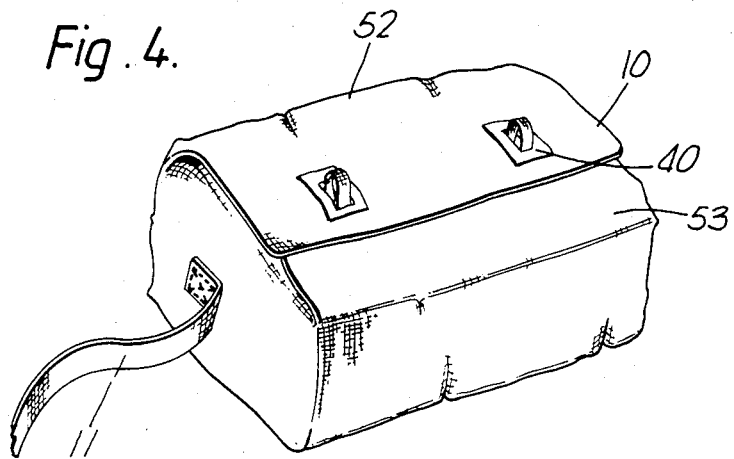
FIGS. 4 & 5 illustrates a parachute packing bag according to the invention.
Figure 5:
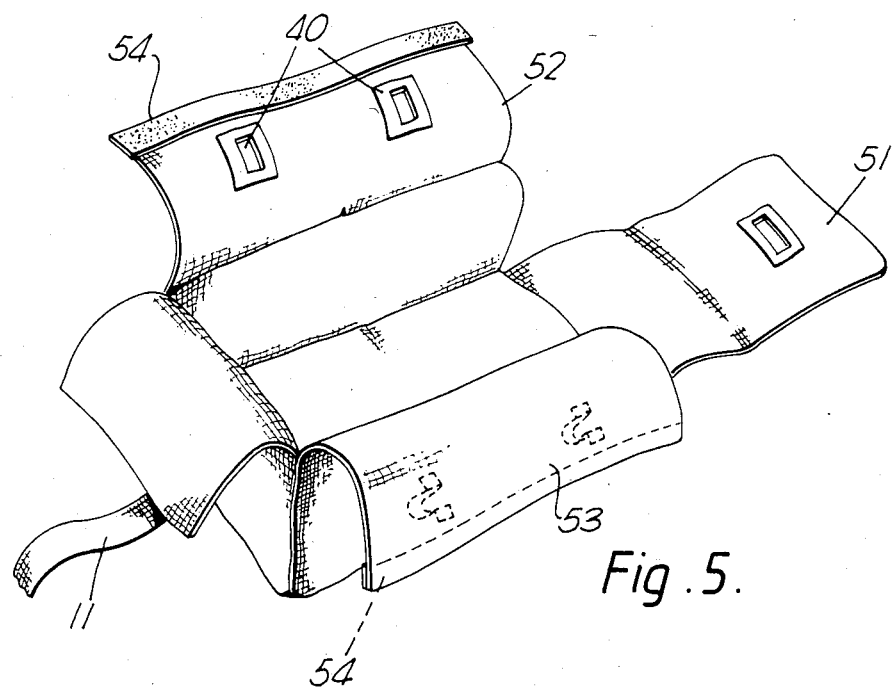

FIG. 4 shows a parachute packing bag particularly suited to this invention. FIG. 4 shows the closed bag and the attached static line. FIG. 5 shows the bag in open arrangement. When packed the parachute is fully enclosed in the bag as shown. Release of any locking pins results when the static line is tensioned during deployment. The release of locking pins may be secured by becketts 40 allows the opening of end flap 51 and consequently the withdrawal of the parachutes from the bag. To facilitate withdrawal the bag has two top cover flaps 52,53 which cover the parachute when folded in the bag and which are arranged to be held closed by for example, a touch and close fastener 54. To ensure the correct withdrawal and deployment sequence the ejector parachute may be secured to the bag by an easily frangible tie. By this means and by use of an easily openable bag it can clearly be seen that position of the ejector parachute in relation to the main ram air parachute may easily be varied whilst ensuring correct deployment.

Although the present invention has been described with respect to a parachutist with or without equipment it should be appreciated that the invention would be quite suitable for use with unmanned drops of equipment. The device could also be adapted by addition of remote control means to permit the remote control of an unmanned equipment drop using a ram air parachute.

I claim:

1. A parachute assembly for attachment to a harness and adapted for deployent by a static line, comprising: a bag having a closed end and an openable end; a static line for attachment to an aircraft, said static line being attached to and extendable from said closed end of the bag; a pilot parachute and a ram air type main parachute both enclosed within said bag, the pilot parachute being located within the bag closer than said main parachute to said closed end of the bag; rigging lines each attached at one end to the main parachute and adapted to be attached at its other end through the openable end of the bag to the harness; a square slidably mounted on said rigging lines; a bridle line attached at one end to the square and at its other end through the main parachute to the pilot parachute, whereby in use the static line on becoming taut withdraws the main parachute from the bag before the pilot chute is withdrawn therefrom but full deployment of the main parachute is delayed by the deployment of the pilot parachute creating tension in the bridle line to maintain the square close to the main parachute.

2. A parachute assembly as in claim 1, wherein the pilot parachute is tied into the bag by an easily frangible tie.

* * * * *